INVENTOR.
EDMUND G. COCCAGNA

INVENTOR.
EDMUND G. COCCAGNA

INVENTOR.
EDMUND G. COCCAGNA

United States Patent Office 3,376,566

Patented Apr. 2, 1968

3,376,566

EXTENDED BANDWIDTH MAGNETIC RECORDING SYSTEM WITH INCREASED STORAGE DENSITY

Edmund G. Coccagna, Villanova, Pa., assignor to Burroughs Corporation, Detroit, Mich., a corporation of Michigan Filed July 15, 1965, Ser. No. 472,225
14 Claims. (Cl. 340—174.1)

This invention relates to a magnetic recording system having an extended bandwidth characteristic. More particularly, it relates to a magnetic recording system which accomplishes this extension by increasing the information storage density upon its magnetic medium without a corresponding decrease in head gap length.

In addition to their other applications, magnetic recording systems are finding widespread use in data processing systems for the storage and reproduction of analog and digital information.

One performance characteristic of such systems which is perpetually undergoing improvement is the range of frequencies which may be responsively included in the information recorded and read. This frequency range is known as the bandwidth (BW).

Since it is well known that any increase in the speed of travel of the magnetic medium past the magnetic head will directly increase the bandwidth, many approaches have been aimed in this direction. However, one disadvantage common to such efforts is the equally direct increase in storage space requirements. This is readily seen, since the higher travel speed of the magnetic medium consumes correspondingly higher amounts of storage area for a given amount of information to thereby reduce the information density upon the storage medium.

While this decrease in density is tolerable in some applications, where the quantity of information involved reaches the proportions usually associated with large scale data processing systems the increase in storage requirements necessary to offset this decrease in density becomes burdensome.

When this disadvantage is considered with the knowledge that the desired bandwidth increase could just as readily have been attained by increasing the information density as by increasing the speed of the medium, it is quickly apparent that any solution reached by increasing the density would automatically include the desired increase in bandwidth.

Previous successful solutions to increase the density and thereby extend the bandwidth have been primarily directed toward positioning the magnetic head closer to the magnetic medium and reducing the length of the head gap. Of these, the reduction in head gap length has received considerable attention, since typically, the shortest wavelength $\lambda$ signal the system is capable of reproducing is in the neighborhood of twice the gap length.

Although there appears to have been a continual effort on the part of many computer manufacturers to prolong this approach, a number of limitations have become apparent.

One is the requirement that the magnetized domain upon the medium be a certain minimum area. Since continued reduction in gap length directly decreases this domain size a physical limitation is evident. Another is the increased precision which is required in the manufacture of these smaller heads. A still further limitation is the minimum output signal that can be tolerated, since a direct relationship exists between gap length and output signal.

It is well known in the recording art that any increase in the information density proposes a much greater problem for reproduction, than for recording. This is especially true since it has been found that by placing the signal coil on the trailing core leg, the length of the gap is not a critical dimension during the writing operation. Thus, as is noted in FIGURE 1, the coil 12 is wound upon the trailing core leg of the head 10, as related to the direction of travel indicated. It might be stated that in this configuration, the core leg which the traveling medium passes last is the portion of the head which performs the writing operation. In any event, the reproduction operation remains a problem, in view of the numerous limitations noted which certainly appear to make any further decrease in gap length an unacceptable solution.

Accordingly, it is an object of the present invention to provide an improved method and apparatus for a magnetic recording system to increase its recording density and extend its bandwidth capabilities without decreasing the head gap length or the head separation distance from the magnetic medium.

This has been accomplished basically by the inclusion of a unique circuit in a recording system which enables the head to encompass a plurality of information segments and to identify each newly arrived information segment into the head gap length by comparing it with the segment leaving the gap.

In spite of the fact that the pulse recording aspect of the present invention, as well as its use in longitudinal, nonreturn-to-zero (NRZ) recording system is stressed in the following description, it is not intended that the invention should be so restricted, since its basic concept includes aspects which apply equally well to analog recording and its usefulness extends to recording systems other than longitudinal.

Other objects of the invention will be pointed out in the following description and claims and illustrated in the accompanying drawings which disclose, by way of example, the principle of the invention and the best mode which has been contemplated of applying that principle.

Figure 1:
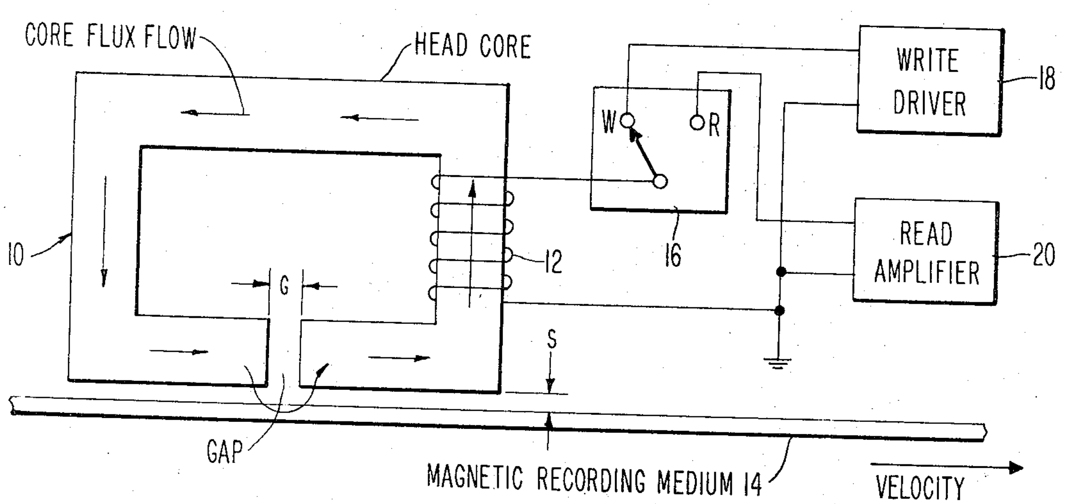
FIGURE 1 illustrates a conventional magnetic recording system, of the longitudinal or horizontal type, which uses a single head for reading and writing.

Referring in particular to FIGURE 1 there is shown the relationship between a ring-type magnetic head 10 and a recording medium 14 as is found in a conventional system of the type usually referred to as a longitudinal or a horizontal magnetic recording system.

While in many conventional recording systems separate heads are used for recording and reproducing, in the particular system illustrated a single ring-type head 10 is used alternately as a write head and a read head. The alternate operation is accomplished through the use of a read-write switch 16, the operation of which will connect either write driver 18 or read amplifier 20 to the head winding 12. If a write operation is considered initially the switch 16 is in the position W as shown in FIGURE 1. With the switch in this position, the write driver 18 is connected to the head winding 12. Upon activation by a write signal, the driver 18 sends a current through the coil 12 which sets up a flux flow around the head core. Because of the reluctance of the gap, most of the magnetomotive force of the signal appears across the head gap. The magnetomotive force so concentrated will act to magnetize the portion of the medium 14 which is momentarily adjacent the gap. If it is assumed that the system being described is a pulse recording system then a square B–H loop characteristic is desired of the megnetic recording medium 14. In the event that an audio or analog type recording system were being described, a more linear B–H characteristic would be desired. The magnetic recording medium 14 will retain the information as a magnetized spot in a polarized direction upon the medium. As previously noted, since the trailing edge of the head core performs the writing operation, the gap length during the recording operation is relatively non-critical. As shown in FIGURE 1, this is accomplished by winding the coil 12 upon the latter leg of the core with relation to the traveling direction of the magnetic medium 14.

At the conclusion of the recording operation, the magnetic pattern imposed upon the medium must be capable of reproduction. To accomplish this, the switch 16 is switched to position R and the medium 14 is again passed under the ring-type head 10. The movement of the magnetized segments upon the medium past the gap of the head 10 will cause a magenic flux to flow along the magnetic flux path of the head. This flux flow will, in turn, provide a signal in the head winding 12. Since the switch 16 has been changed to the R position, the signal created in the head winding 12 will be applied to the read amplifier 20. It should be noted that since a voltage is induced only when the magnetic field changes, that the induced signal will be shifted 90° out of phase with the flow of the magnetic flux producing the signal. In the event that this was an analog recording system, this, of course, would not matter. However, with a pulse recording system, as is presently being described, the winding signal must be integrated to get the pulse output to match the pulse input. This is commonly accomplished by the use of a trigger circuit, such as a Schmitt trigger.

Figure 2:
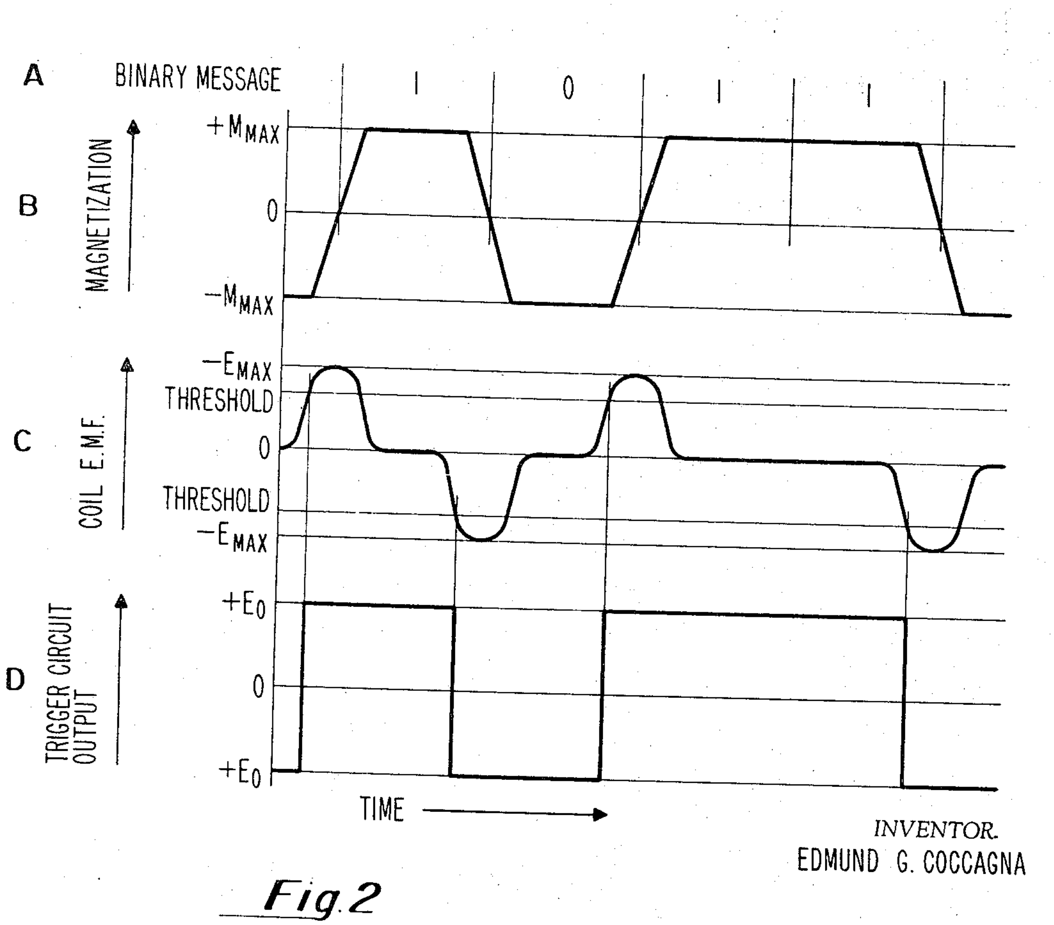
FIGURE 2 illustrates the principal waveforms which correspond to a binary message written upon a magnetic medium showing its phase compensation accomplished by a trigger circuit.

The trigger circuit acts as a flip-flop device which is set by positive signal pulse above a certain threshold amplitude and resets on a negative pulse below a certain negative threshold amplitude. This sequence is illustrated in FIGURE 2, as a set of waveforms. For ease of explanation the waveforms are referred to alphabetically in top to bottom order. A binary message is set forth as A in FIGURE 2. The system to be described is a nonreturn-to-zero-type (NRZ) and is illustrated as such in waveform B.

In a NRZ system, the pulse digits corresponding to binary values "one" and "zero" respectively, are indicated by either a positive or a negative signal above or below a zero level. Since the binary message is 1011, waveform A labeled "magnetization" provides a positive signal for one time period, followed by a negative signal for one, with a positive signal thereafter for two periods. As previously indicated, the output signal electromotive force (E.M.F.) is present only during a change in magnetization. Therefore, this signal is created during the period which corresponds to the variation in magnetization from either a negative to a positive level or vice versa. Reference to waveform B of FIGURE 2 illustrates this signal from head coil 12. It should be noted that the voltage in waveform B is passing through its maximum amplitude when the magnetization amplitude is undergoing its maximum change. Thus each positive signal of the electromotive force is passing through its peak at a time when the magnetization curve is passing through its "zero" level. Alternately, the change of magnetization in waveform A from a maximum positive level to "zero" will produce a coil signal in a negative direction. During the period of fixed magnetization, shown in waveform A regardless of whether it is a positive or a negative fixed level, the signal from the coil 12 in waveform B remains at the "zero" voltage level. This cycle of events will occur each time the magnetization curve changes direction. Waveform C of FIGURE 2 illustrates the output signal from a trigger circuit. By a comparison of waveforms B and C, it is shown that the switching time of the trigger circuits corresponds to a fixed level or threshold on the coil output signal. Thus, when the coil E.M.F. waveform reaches a threshold level, just previous to its maximum peak voltage, the trigger output signal will shift from an output of one polarity to an output of another.

The plurality of variables which effect the design of a magnetic recording system have heretofore been felt to effectively prevent any theoretical design of such a system For this reason, past systems have been almost universally designed empirically. For example, it is well known to be impossible to record a perfect step of magnetization on the medium due to the inductance of the recording head and the nature of the ferromagnetic medium. Further, even if such a recording were possible, it would not appear as a signal at the terminals of the head coil during the reading operation because of the finite thickness of the medium, the separation between the head and medium, the finite length of one gap and the capacitance between the turns of the head winding.

However, if certain of these variables were given assumed values, it is possible to reach valid mathematical conclusions. For instance, in the reading process, if the medium thickness is assumed to be zero and the capacitance of the windings is ignored it has been found that there exists an analytical relationship between the electromotive force produced in the head core and the number of cycles of signal present in the gap length.

Figure 3:
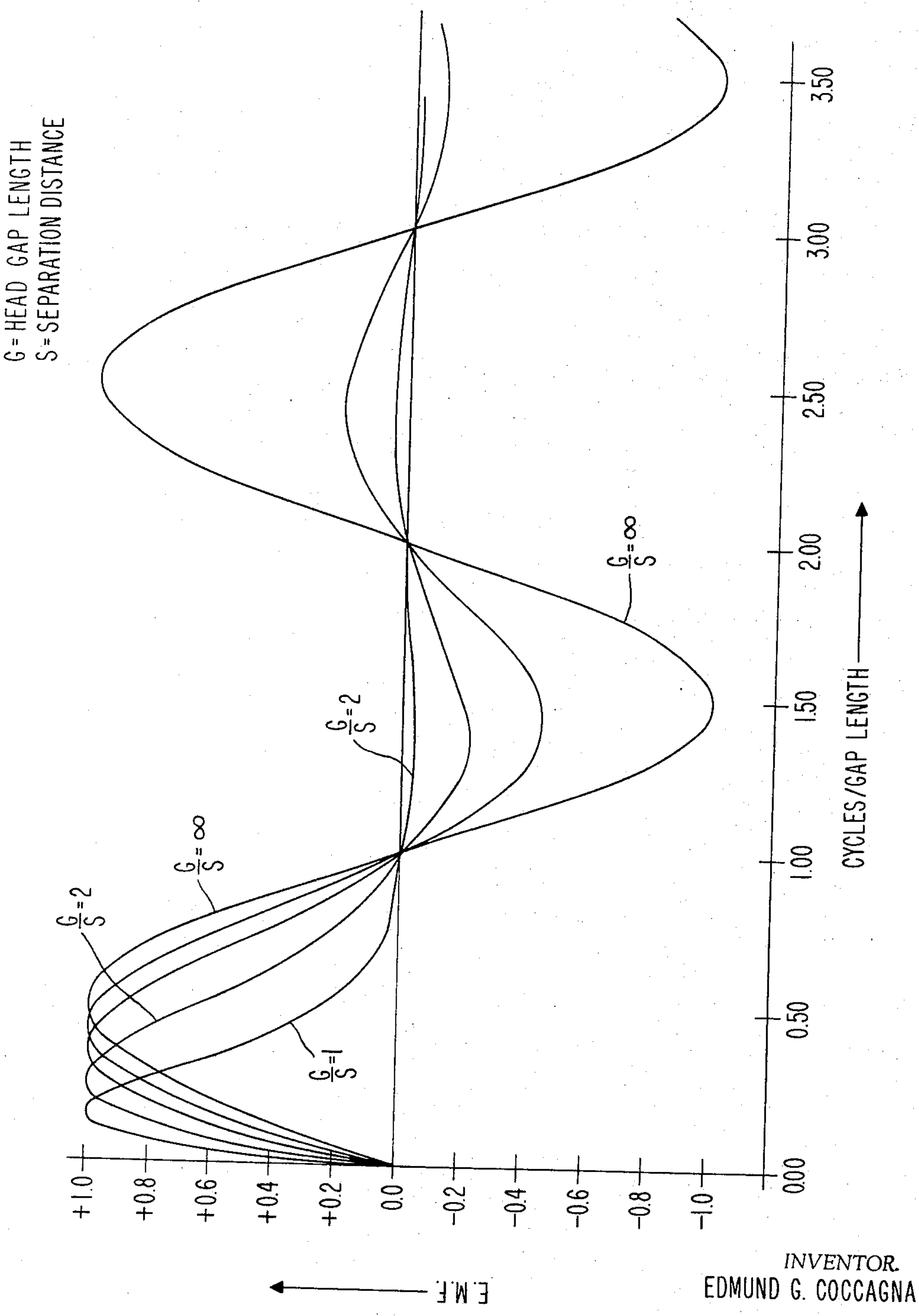
FIGURE 3 is a graphical illustration showing the electromotive force (E.M.F.) developed across the head coil for a sine wave of flux written upon the medium for a number of different ratios of gap length to separation distance.

This relatiosnip has been plotted in the reproduction of a previously recorded sine wave and is illustrated in FIGURE 3. A family of such curves has been achieved by using various ratios of gap length to separation distance. The ratio used for each curve is shown on the figure.

Although it is especially notable in the sine wave curve with an infinite ratio, it is significant practically throughout the curve family that where a sine wave signal of varying frequency is being read from a magnetic medium, the electromotive force (E.M.F.) produced in the head core passes through zero as a full cycle or a multiple thereof is present within its gap.

Since it is well known that almost all of the magnetization on the recording medium which influences or is linked with the recording head is that within the gap length of the recording head, it can therefore be stated that if one or more full waves of magnetization appears within the head gap, then no E.M.F. is developed in the head core. This statement has increased significance when related to a specific application. For example, if a non-return-to-zero (NRZ) recording system is considered wherein the recorded sine wave is replaced by two bits of opposite magnetization and both bits are present at one time under the head gap then substantially no electromotive force would be developed. However, if only half of the sine wave of magnetization appears within the head gap, corresponding to two successive bits having the same magnetization then an electromotive force would be developed.

In summary, when reading a sine wave signal of changing frequency, the output E.M.F. passes through zero when there is a complete cycle or multiples thereof within the gap. Conversely, where an output signal is present, it may be concluded that a portion of a complete cycle, or a number of complete cycles plus a portion of another is present in the gap.

When these conclusions are specifically applied to a recording system, using for example, NRZ pulse recording techniques, the presence of a positive and a negative pulse within the gap at one time provides zero output voltage. However, the presence of a pair of positive pulses does not afford such cancellation and the output voltage corresponds to a maximum value in the positive direction. Similarly, a negative maximum voltage is provided when a pair of negative pulses are present within the gap. If this concept is extended to consider the case where it is known initially what the arrangement of bits is within the head gap, then as each voltage pulse is received from the head, sufficient information is available to identify the bit that has entered the gap length of the head. In other words, where the initial arrangement of bits within the head gap is known, a voltage pulse from the head will indicate that a bit has entered the gap length which is different from the bit that has left the gap length. In this way, it is possible to identify the bit entering the gap length if the bit leaving the gap is known. Alternately, if no voltage pulse is received from the head, then it is known that the bit entering the gap length is the same as the one leaving. In order to implement this, means are necessary to receive and store the information leaving the gap which may be later compared with newly received information. Thus, a revolving storage is required, such as, for example, a delay line or a shift register, and a device to compare the information received from the head with the information leaving the rotating storage. A block diagram of such a circuit is shown in FIGURE 4.

Figure 4:
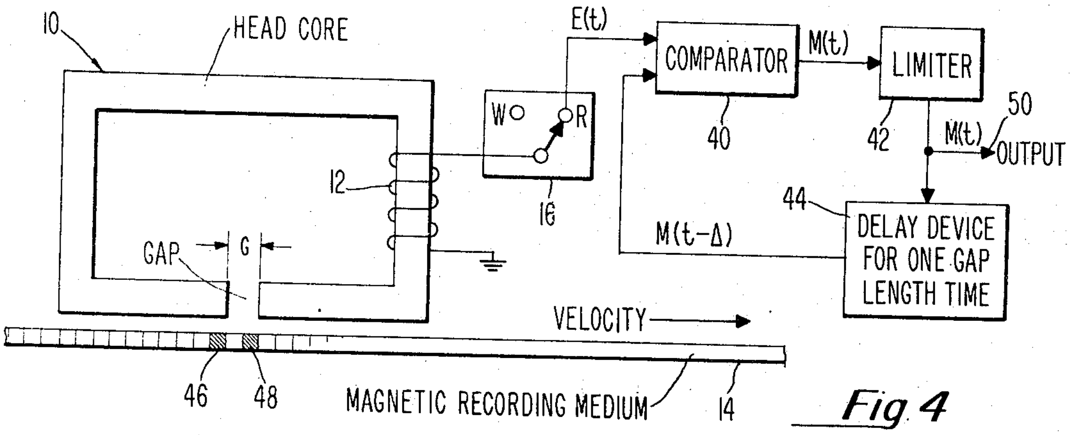
FIGURE 4 is a representative block diagram of the circuit used for reading a message of increased density, namely, having a minimum bit length equal to one-half the gap length.

In FIGURE 4, consider a magnetic pattern of NRZ pulse information written upon the medium 14. The pulse bits are noted as segments upon the medium. The shaded segments, referenced as 46 and 48, are bits which are respectively entering and leaving the gap length G when the medium 14 is moved in the direction indicated.

With the switch 16 in the read position R, any signal voltage $E(t)$ from the head coil 12 caused by a flux flow in the head core is applied to a comparator 40. At the same moment, a second signal $M(t-\Delta)$ is also applied to the comparator 40 from the delay device 44. This second signal is a previous output signal $M(t)$ which has undergone a delay of one gap length time by the delay device 44. For example, in FIGURE 4, consider that the medium 14 has just moved bit 48 into the gap G where it has been sensed, compared by comparator 40 and stored in delay device 44. During the next bit time, the medium moves bits 46 and 48 to the locations shown and the stored bit 48 in delay device 44 beings the second half of its delay period. In the following bit time, bit 46 on the medium moves into gap G where it is sensed, applied to comparator 40 and then entered into delay device 44 for storage therein. Its application to comparator 40 coincides with the arrival of stored bit 48 from delay device 44. No additional details regarding the comparator circuit 40 are considered necessary since such devices are well known to the electronic art and any such circuit will accomplish the task adequately, so long as it will perform the basic comparison of receiving two input signals and indicating their agreement or disagreement. Further, the limiter circuit 42 is not considered to require any detailed discussion since it is also a circuit well known to the electronic art. Any such device whose output is automatically prevented from exceeding a predetermined value would be entirely satisfactory. The application in the present instance requires limitation of both positive and negative values, consequently, the predetermined value of limitation is applicable to signals of either polarity. Thus it functions in this system to let only the one and zero levels enter the delay device 44 and the output terminal 50.

Summarizing the discussion of FIGURE 4, the simultaneous comparison of the present output voltage with a previous one read a full gap time earlier provides an output signal $M(t)$ from the comparator 40 which identifies the bit entering the gap by comparing it to the bit leaving the gap.

Figure 5:
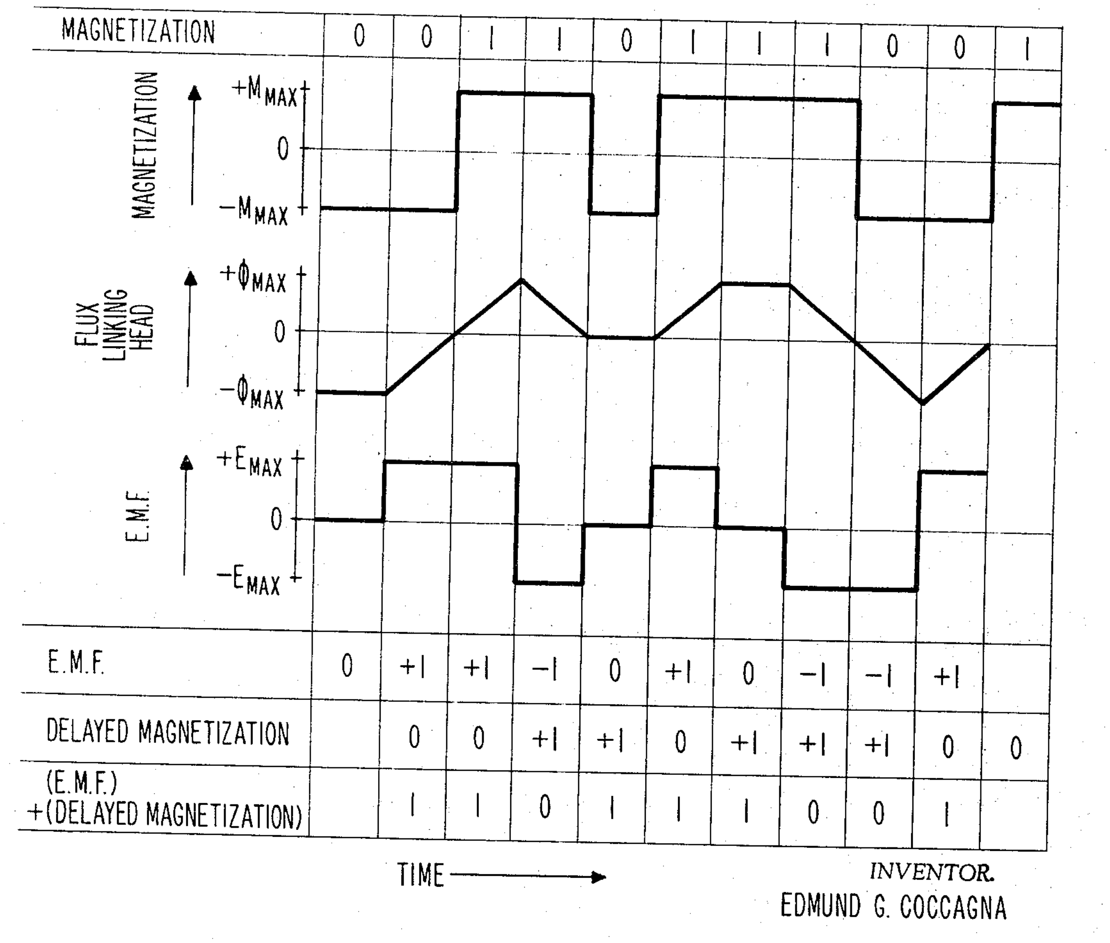
FIGURE 5 is the set of waveforms illustrating the reproduction of a sample message utilizing the circuit shown in FIGURE 4, also shown is an accompanying table showing correspondence between the massage written and that read by the improved system.

Reproduction waveforms of a message on the medium of minimum bit length equal to half the gap length is shown in FIGURE 5. Considering waveforms shown from top to bottom, the top waveform titled "magnetization" is a nonreturn-to-zero magnetic pattern on a medium which corresponds to the message illustrated across the top of the figure. Immediately below this magnetized waveform is a curve of flux which links the head as the medium travels past it. The E.M.F. waveform which corresponds to this flux is shown just below. Thus as the message proceeds through binary digits 0011, the magnetization curve illustrates the level shift from a negative maximum level to a positive maximum as the message passes from "0" bits to "1" bits. The flux lines generated by these magnetized segments upon the medium links the head, as previously described, only during magnetic transitions. Consequently, the E.M.F. created in the head corresponds to these transitions in chronological sequence. Thus, as the third bit arrives within the head gap, the first bit is leaving, since they are different an output signal is initiated by the E.M.F. across the gap. Subsequent E.M.F. readings across the gap are horizontally listed in the table immediately below the waveforms. When these readings are combined by the comparator with the delay readings of magnetization listed in the next lower row, a sequence of output bits is achieved in the bottom row which is of the same form as the magnetization on the medium. The delay device is initially filled with zeros then with ones by the function of the limiter.

What has been described is an improved magnetic recording system capable of recording and reproducing magnetic information upon a medium which information density is increased beyond the usually imposed limitation of head gap length. This is achieved through the use of a circuit in conjunction with the magnetic recording system whose operational concept relies on the fact that the amplitude of the head gap length transfer function passes through zero. The almost periodic nature in which this function passes through zero enables the circuits to be used in a system whose minimum reproducible wave length is reduced by a factor of perhaps three to four below present day limits.

Obviously many modifications of the present invention are possible in view of these teachings. It is therefore intended that the present invention be limited by the scope of the following claims rather than as specifically described and illustrated.

I claim:

1. An improved magnetic recording-reproducing system whose shortest wavelength of reproducible magnetization is not limited by the gap length of its magnetic head comprising in combination, a magnetic recording-reproducing system including a magnetic head with a signal coil wound thereon, a comparator circuit having a first and a second input means and output means, said first input means connected to the head coil and a delay device connected from the output means to the second input means of said comparator circuit enabling said delay device to receive and store each output signal and later reapply a previous output signal from said comparator for comparison with a present output signal from said signal coil to thereby provide a present output signal from said comparator which identifies the present output signal from the signal coil.

2. The recording-reproducing system as set forth in claim 1 wherein the comparator circuit is a simple analog summing circuit, and the delay device is a shift storage register.

3. An improved magnetic reproducing system whose shortest wavelength of reproducible magnetization is not limited by the gap length of its magnetic head, comprising in combination, a magnetic reproducing system including a magnetic read head with a signal coil wound thereon and a moving magnetic medium, a comparator circuit having a first and a second input means and output means, said first input means connected to the head coil and a delay device connected from said output means to the second input means enabling said delay device to receive and store each output signal and later reapply a previous output signal from said comparator for comparison with a present output signal from said signal coil to thereby provide a present output signal from said comparator which identifies the present output signal from said head coil.

4. The reproducing system as set forth in claim 3 wherein the comparator circuit is a simple analog summing circuit and the delay device is a shift register comprised of a plurality of bistable stages.

5. An improved magnetic recording-reproducing system whose shortest wavelength of recorded and reproducible magnetization is not limited by the gap length of its magnetic head, comprising in combination, a magnetic recording-reproducing system including a ring-type magnetic head with a coil wound on one core arm thereon and a moving magnetic medium traveling past said head in a direction such as to finally pass the core arm with said coil wound thereon, a comparator circuit having first and second input means and an output means with said first input means connected to the head coil and a delay device connected from the output means to the second input means enabling said delay device to later reapply a previous output signal from said comparator for comparison with a present output signal from said head coil to thereby provide a present output signal from said comparator which identifies said present head coil output signal.

6. An extended bandwidth longitudinal magnetic recording-reproducing system with a ring-type head having a gap length more than double the wavelength of the highest frequency of its bandwidth comprising in combination, a common read-write signal coil wound on the trailing portion of the ring-type magnetic head core, a read-write switching means commonly connected to said coil, a comparator circuit and a write driver circuit both connected to said switching means for alternate connection to said coil during read and write operations respectively, and a delay storage device connected to said comparator circuit to receive and temporarily store the output signals therefrom and return said signals to the comparator for a later comparison with the output signal from the coil and thereby identify each newly arrived segment of information within the gap length of the magnetic head.

7. The recording-reproducing system as set forth in claim 6 above, wherein said comparator circuit has a first and a second input means and an output means, said first input means connected to the signal coil through the switching means during a read operation and a delay device connected from the output means to the second input means enabling said delay device to receive and temporarily store each output signal from said comparator for later comparison with the output signal from the coil and thereby identify the newly arrived segment of information within the gap length of the magnetic head.

8. An improved longitudinal recording-reproducing system whose wavelength of recorded and reproducible magnetization is independent of the gap length of its magnetic head, comprising in combination, a ring-type magnetic head having a first and a second core arm with a coil wound on said second arm thereof and a moving magnetic medium traveling past said head in a direction such as to pass the second arm after the first, a comparator circuit having a first and a second input means and an output means with said first input means connected to the coil wound on the head and a delay device connected from the output means to the second input means enabling said delay device to later reapply a previous output signal from said comparator for comparison with a present output signal from the head coil to thereby identify each newly arrived segment of information within the gap length of the magnetic head.

9. An improved longitudinal magnetic recording-reproducing system whose shortest wavelength of recorded and reproducible magnetization is not limited by the gap length of its magnetic head, comprising in combination, a magnetic recording-reproducing system including a ring-type magnetic head with a coil wound thereon such that a moving magnetic medium traveling past said head during a writing operation passes the core portion having said coil wound thereon after having passed the remaining core portion, a comparator circuit having first and second input means and an output means with said first input means connected to the coil wound on the magnetic head and a delay device connected from the output means to the second input means, said delay device having a delay time equal to the length of the gap in said magnetic head divided by the travel rate of the magnetic medium, enabling the delay device to receive, delay and reapply each output signal from said comparator circuit with a later signal from the coil to thereby identify each segment of information entering the head gap by comparing it with the segment of information leaving said gap.

10. A multiple-bit magnetic recording system to record and reproduce previously recorded nonreturn-to-zero pulse information comprising a magnetic read head whose gap length is greater than the information bit length, said magnetic head having a signal coil wound thereon, a comparator circuit connected to said signal coil and a delay storage device connected to said comparator circuit, said comparator circuit connected to said coil and said delay device to perform a comparison operation between the read signal presently received from said coil and a delayed signal received from said delay storage device to provide from said comparator circuit an output signal which simultaneously identifies the presently received signal and stores it in said delay storage device for later reapplication to said comparator circuit.

11. The recording system as set forth in claim 10, wherein said comparator circuit comprises an analog summing device and said delay storage device includes a shift register having a plurality of flip-flop circuits.

12. A multiple-bit magnetic reading system to reproduce magnetically recorded nonreturn-to-zero pulse information using a magnetic read head whose gap length is greater than the bit length comprising a magnetic head having a signal coil wound thereon, a comparator circuit connected to said signal coil and a delay device connected to said comparator circuit, said comparator circuit connected to perform a comparison operation between a read signal received from said coil and a delayed signal received from said delay device to provide from said comparator circuit an output signal which is presently stored by said delay device for later reapplication to said comparator circuit.

13. A multiple-bit magnetic reading system to reproduce magnetically recorded nonreturn-to-zero pulse information using a magnetic read head whose gap length is greater than the bit length comprising a magnetic head having a signal coil wound thereon, a comparator circuit connected to said signal coil, a limiter circuit serially connected to the comparator circuit and a delay device connected between the limiter circuit and the comparator circuit, said comparator circuit connected to perform a comparison operation between a present signal received from the coil and a delayed signal received from the delay device to provide from said comparator circuit an output signal which identifies the present signal by comparing it with the delayed signal.

14. The system as set forth in claim 12 wherein said comparator is a resistive summing network, said limiter includes a first and a second reference diode connected for limiting oppositely polarized portions of the signal amplitude and the delay device is a plurality of successively connected flip-flop stages.

References Cited

UNITED STATES PATENTS

| | | | |
|---|---|---|---|
| 3,217,329 | 11/1965 | Gabor | 340—174.1 |
| 3,251,046 | 5/1966 | Ragle et al. | 340—174.1 |
| 3,323,115 | 5/1967 | Sims | 340—174.1 |

BERNARD KONICK, *Primary Examiner.*

A. I. NEUSTADT, *Assistant Examiner.*